R. BAGGALEY.
METHOD OF TREATING ORES.
APPLICATION FILED JUNE 17, 1913.
1,135,488.
Patented Apr. 13, 1915.
2 SHEETS—SHEET 1.
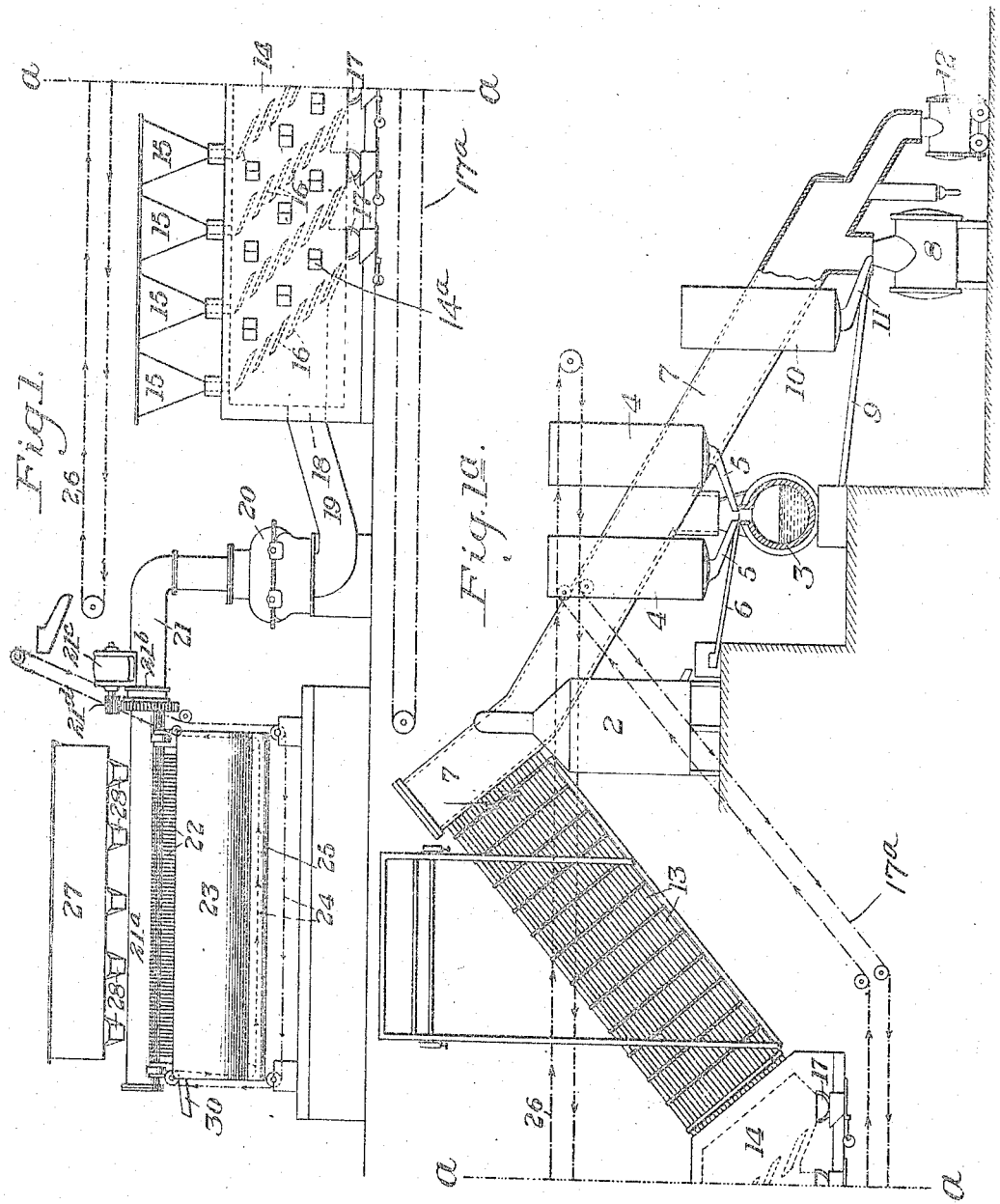

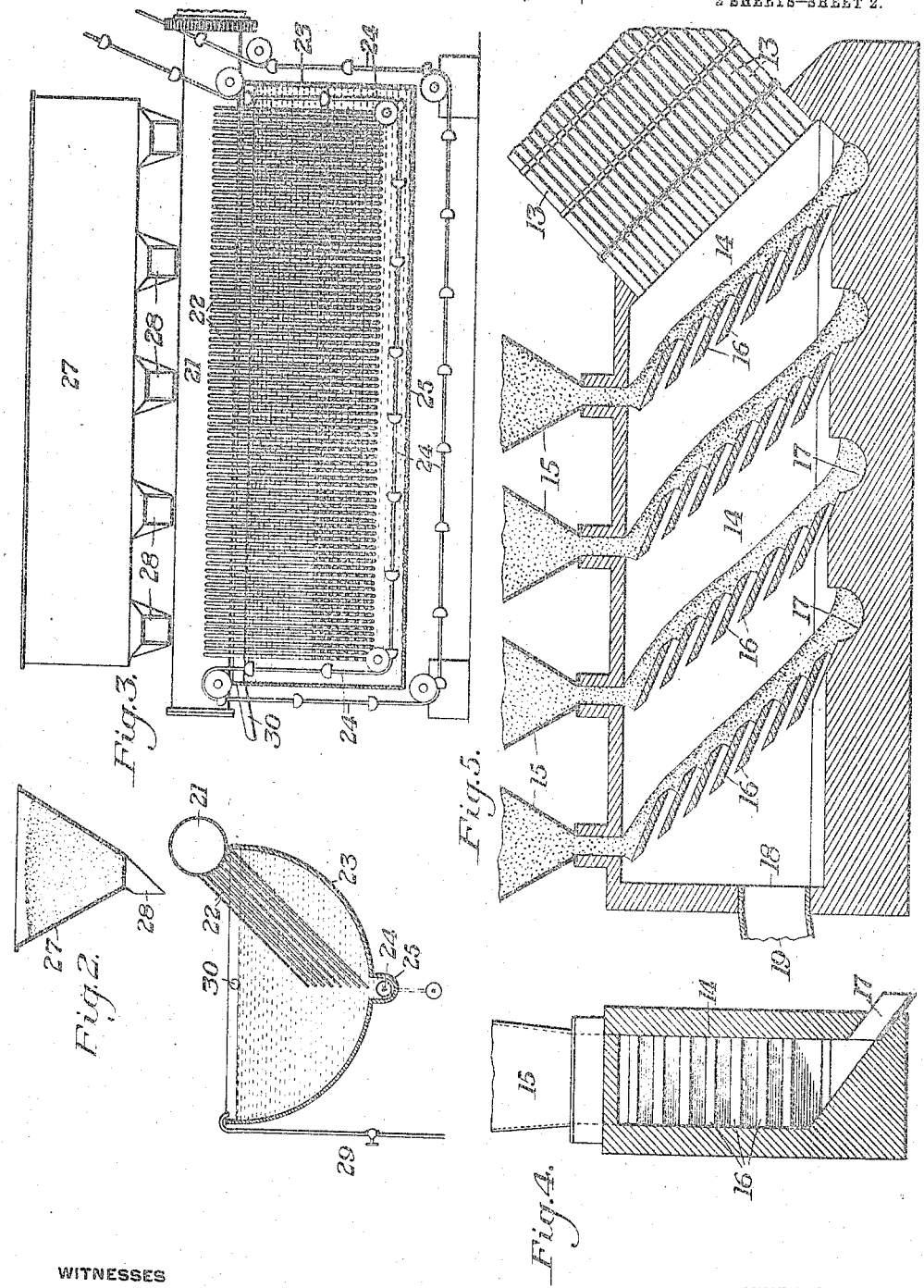

UNITED STATES PATENT OFFICE.

RALPH BAGGALEY, OF PITTSBURGH, PENNSYLVANIA.

METHOD OF TREATING ORES.

1,135,488.  Specification of Letters Patent.  Patented Apr. 13, 1915.

Application filed June 17, 1913. Serial No. 774,113.

*To all whom it may concern:*

Be it known that I, RALPH BAGGALEY, a citizen of the United States, residing at Pittsburgh, in the county of Allegheny and State of Pennsylvania, have invented a new and useful Improvement in the Methods of Treating Ores, of which the following is a full, clear, and exact description, reference being had to the accompanying drawings, forming part of this specification, in which—

Figures 1 and 1ª together show a diagrammatic side elevation of my preferred form of complete apparatus for smelting and refining ores, and absorbing and neutralizing the fumes. Fig. 2 is a cross-section of the neutralizing tank. Fig. 3 is a sectional side elevation of the neutralizing apparatus. Fig. 4 is a cross-section of the ore screens. Fig. 5 is a sectional side elevation of said ore screens.

My invention relates to the smelting of ores, particularly ores such as copper, gold and silver ores, in the smelting of which enormous volumes of deleterious fumes are discharged.

It is well known that in the neighborhood of smelting plants with ores containing sulfur, arsenic, &c., vegetation is practically destroyed, often for a radius of thirty or forty miles. Many attempts have been made to avoid this difficulty, but without success. Many copper smelting plants are now shut down as the result of injunctions obtained by surrounding property owners on account of the devastation of the country resulting from these fumes coming from the apparatus for treating such classes of ore.

My invention is designed to overcome these difficulties, and to reduce or practically do away with the discharge of injurious fumes into the atmosphere.

It is also designed to utilize the substances and compounds making up such fumes, to produce a commercially valuable material, as well as to utilize a portion of the fumes as fuel in parts of the apparatus.

Another very important object of my invention is to reduce or do away with the volatilization of valuable metals, and also to reduce or do away with the use of carbonaceous fuel in smelting the ores.

In carrying out my invention in its preferred form, I deliver the fumes into and through a body of neutralizing material, preferably in a liquid condition. The fumes rising through this liquid bath of neutralizing material, which is preferably milk of lime, will be rendered substantially harmless so that the vapors given off will have little or no deleterious effect. Further, I prefer to pass the fumes in contact with the ore-feed previous to feeding them into the neutralizing material, thus causing a heavy deposit of sulfur, iron, zinc, &c., on the ore, thus drying the ore, adding fuel value to it, and preheating it to a degree less than the fusion point of sulfur.

In carrying out my system, I do away with the expensive stack and flue system now generally employed, and employ a pressure blower which sucks the fumes through a flue and forces them through the neutralizing bath, after having been cooled by passage through the ore-feed; and also preferably by passing them through cooling flues prior to reaching the ore-feed. This preliminary cooling is important in order to prevent the fusing of the sulfur in the ore as the hot fumes come in contact therewith.

A small percentage of the calcium sulfate formed by the rising of the fumes through the milk of lime bath may be safely fed into the converter, but this amount should be limited owing to the sulfur in the compound and the inability of the slag in the converter to absorb more than one per cent thereof. The greater portion of the calcium sulfate and calcium sulfite is taken away from the neutralizing tank and is stored. It may be used as a fertilizer or for the production of plaster of Paris, or for any other desired commercial use. This finely divided calcium sulfate in itself forms an excellent fertilizer, and may be used either alone or in combination with phosphates, nitrogen compound, phosphoric acid or potash.

In the drawings, in which I have shown one form of apparatus for carrying out my invention, 2 represents the smelter, which may be of the usual form, and is used solely for producing the first bath of low-grade matte with which the primary converter 3 is supplied. As soon as this bath of melted low-grade matte is supplied to the converter 3, the furnace may be and preferably is closed off, and its operation permanently stopped. Of course, I may pre-melt low-grade matte obtained from some other source for the first bath in the converter, which converter thereafter acts upon ore and takes the place of the blast furnace commonly used. The ore for the converter 3 may be supplied from suitable bins 4, 4, from which the feed passes through spouts 5, 5 which may be controlled in any desirable way.

6 represents the trough, by which the low-grade matte may be supplied from the blast furnace for the preliminary bath in the converter by gravity.

The converter discharges its fumes into a flue 7, which is preferably inclined upwardly as shown in order to provide for the gravity discharge of matte from the primary converter 3 to the secondary converter 8 at a lower level, this matte flowing by gravity through spout indicated at 9. Silicious ore or silicious material may be fed into the secondary converter 8 from bin 10 through feed-control spout 11. The converter 8 discharges fumes into the flue 7, as shown, and I may also employ a refining furnace 12 of special design, which if used also discharges its fumes into the flue 7.

The upper end of flue 7 discharges the fumes into a series of cooling flues 13 (Figs. 1ª and 5), and as the fumes flow through the small channels or conduits of this cooling device, which are exposed to the atmosphere, the fumes will be cooled down by radiation and conduction to a point where they will not fuse the sulfur in the ore with which they next contact. The lower ends of these cooling flues, which are preferably arranged in an inclined position, discharge into a large chamber 14 (Fig. 5), through which the ore-feeds pass. In the form shown, the top of this chamber is provided with a series of hoppers 15, discharging onto inclined refractory steps 16 of vitrified material, down which the ore streams flow in an inclined position. At the bottom of these steps the ore streams discharge onto inclined bottom portions, and at their spouts 17 onto a suitable conveyer 17ª. This conveyer may be of any suitable type and is for carrying the ore and delivering it to the primary or smelting converter. The cooled fumes pass through these ore streams and pass out at the opposite end of the chamber through flue 18. The feed of the ore streams may be regulated by any suitable valve or gate mechanisms, and during the operation the ore is dried, preheated and supplied with additional material in the form of sulfur, zinc, iron, antimony, arsenic, and other oxidizable elements and compounds, which aid in the production of heat in the primary converter.

The fumes which have now been decreased by the deposit of these elements and compounds on the ore and have been further cooled, pass on through conduit 19 (Fig. 1) to the suction and pressure blower shown at 20, through which they are sucked and forced onward through flue 21, from the sides of which a large number of small exit pipes 22 (Fig. 2) feed the fumes into the lower portion of a bath of milk of lime in a reservoir 23. The fumes are forced downwardly under this bath under preferably about four pounds pressure, and the bath is preferably nine or ten feet deep so that the small bubbles of fumes pass up through this neutralizing and cooling bath. This bath not only forms calcium sulfate and calcium sulfite by combination between the lime and the sulfur of the fumes, but also cools the fumes and neutralizes them so that the discharge from this bath into the atmosphere is comparatively innocuous.

The exact depth of the bath may be, of course, varied; and the necessary depth will depend upon the size of the pipes 22 and the sizes of the gas bubbles escaping therefrom. The effective depth should be sufficient in all cases to give time for a complete neutralizing effect upon the gas bubbles.

I prefer to form the end portion 21ª of the flue 20 which has the exit pipes 22, with a volatilizable joint at 21ᵇ. By means of a motor 21ᶜ geared to said end portion, as indicated at 21ᵈ, said portion may be turned to raise the pipes 22 out of the bath to enable them to be cleaned when necessary.

The system should be so proportioned and arranged that the fumes and gases be cooled to a point below 300 degrees Fahrenheit in the radiating tubes and in the ore-feed or screen chamber, since thereby the contained values will be precipitated and incrusted on the ore. If it be found that any values are lost in the neutralizing tank, then the gases may be further cooled in any suitable manner before discharging them into the neutralizing bath. Thus the values may be recovered from the fumes and gases before they reach the neutralizing tank, and may be thereafter treated in the manner of handling concentrates, flue dust, fines, &c.

The deposited calcium sulfate and calcium sulfite in the neutralizing tank or vat may be removed in any suitable manner, as for instance, by a conveyer 24 (Figs. 2 and 3) operating within a gutter 25 formed in the bottom portion of the tank. The path of this conveyer is diagrammatically shown in Fig. 1, the material preferably being carried up to a point where it is deposited upon another conveyer 26, by which it may be taken over to and delivered into the ore hoppers 15. The largest amount of this product, however, is deflected from this conveyer at an intermediate point, and may be taken to storage bins for use as fertilizer or conversion into other commercial products.

27 (Fig. 3) is a bin, from which lime may be fed through controlled chutes 28 into the milk of lime bath to replace the lime which is converted into sulfate and sulfite; and 29 represents a water feed to this tank; 30 (Figs. 1 and 3) being the overflow spout which is preferably used to maintain a constant level therein.

The chamber 14 (Fig. 1) is preferably provided with side openings having removable closures 14ᵃ, and through which the ore may be reached as shown in Fig. 1. If the ore streams clog in this chamber, poking devices may be inserted through these openings and the clogged portions broken up to allow the streams of ore to flow so that the fumes may continuously contact with fresh portions of ore.

Where the secondary converter 8 (Fig. 1ᵃ) is used in the system, it is employed to reduce the matte to blister copper by feeding mineral-bearing silicious ores into it, and it also discharges its fumes into the main flue. In like manner, the refining furnace 12 when used will discharge fumes into the same main flue.

The advantages of my invention will be obvious to those skilled in the art, since the destruction of vegetation is greatly reduced or entirely avoided, loss by volatilization of values is largely prevented, a valuable by-product is obtained, and the labor cost is low.

Many variations may be made in the form and arrangement of the apparatus, without departing from my invention, and I intend to cover portions of my system as to both process and apparatus without reference to whether other parts are used or not.

I claim :—

1. In the smelting of copper, gold and silver ores, the method of preventing the escape into the atmosphere of injurious fumes and dust from a furnace, which consists in delivering them in relatively small streams into a bath of neutralizing liquid at a considerable distance below the surface thereof and permitting them to pass upwardly through such bath, substantially as described.

2. In the smelting of sulfid ores, the method which consists in conveying the sulfur-bearing fumes resulting from the smelting and reducing operation and conducting them in relatively small streams into a bath containing milk of lime at a point considerably below its surface, thereby causing the fumes to bubble upwardly through the bath; substantially as described.

3. In the smelting of sulfid ores, the method which consists in confining the fumes and dust resulting from the smelting operations, and bringing them into contact with fresh ore, and thereafter forcing the gases in small streams into a liquid bath containing a neutralizing agent for the sulfur compounds in the gases; substantially as described.

4. In the smelting of copper, gold and silver ores, the method which consists in the smelting of the ores in a closed furnace, conveying the fumes and dust from the furnace through a closed passage and into contact with value-bearing material, and thereafter forcing the gases into a liquid bath containing a neutralizing agent, substantially as described.

5. In the smelting of copper, gold and silver ores, the method which consists in smelting and converting the ores confining the fumes resulting from the smelting operation and bringing them into contact with value-bearing material to preheat the same for use in the smelting and converting operations, and causing said value-bearing material to receive a deposit of the ore and fuel values contained in the fumes and reducing the temperature of said gases before bringing them in contact with such material to a temperature below that at which the gases will cause fusion of the sulfur contained in said material, substantially as described.

6. The method of handling injurious fumes from copper smelting and converting operations, which consists in bringing them in contact with ore and previously cooling the fumes to a temperature below that at which they will cause fusion of the sulfur contained in said ore, substantially as described.

7. The method of handling injurious fumes from copper smelting and converting operations, which consists in dividing the fumes into a plurality of relatively small streams and subjecting them to a cooling action while so divided, and then bringing them into contact with ore, substantially as described.

8. In the method of handling injurious fumes resulting from the treatment of sulfide ores, the steps which consist in confining the fumes and cooling them, then bringing the fumes into contact with ore material to separate ore and fuel values from the fumes and cause such values to be deposited upon the ore material, and then conducting the fumes through a liquid bath of neutralizing material, substantially as described.

9. In the method of handling injurious fumes resulting from the treatment of sulfide ores, the steps which consist in conducting the fumes through closed channels in which they are subjected to a cooling operation, then bringing the fumes in contact with ore material to separate ore and fuel values from the fumes and cause such values to be deposited upon the ore material, and then conducting the fumes through a bath of milk of lime, substantially as described.

10. The method of treating sulfid ore, which consists in feeding it into a molten bath undergoing conversion, and passing the fumes therefrom upwardly in small streams through a bath of milk of lime; substantially as described.

11. In the smelting and conversion of gold, silver and copper ores, the steps which consist in passing the fumes through a chamber and bringing them in contact in said chamber with moving bodies of ore, and then passing the fumes through a neutralizing bath, substantially as described.

12. In the treatment of sulfid ores, the method which consists in forming a low grade matte, subjecting the same to a conversion, feeding ore-bearing material into the converter, conducting the fumes from the converter and into contact with fresh ore material to preheat the same, depositing thereon ore and fuel values contained in the fumes, and then passing the fumes through a neutralizing bath, substantially as described.

13. In the treatment of sulfid ores, the method which consists in forming a low grade matte, subjecting the same to a conversion, feeding ore-bearing material into the converter, conducting the fumes from the converter and into contact with fresh ore material to preheat the same, depositing thereon ore and fuel values contained in the fumes, passing the fumes through a neutralizing bath, and cooling the fumes before bringing them into contact with the ore material to a temperature below 200 degrees F., substantially as described.

14. The method of preventing escape into the atmosphere of injurious fumes and dust resulting from the treatment of sulfid ores, which consists in confining the fumes resulting from the smelting and reducing operations, conveying the fumes and dividing them into a multiplicity of relatively small streams, and causing said streams to be discharged within a liquid bath containing a neutralizing agent, substantially as described.

15. In the treatment of ores, the steps consisting in cooling the fumes to a point below 300 degrees Fahrenheit, bringing them in contact with value-bearing materials, and recovering the values therefrom; substantially as described.

16. In the treatment of ores, the steps consisting of cooling the fumes to a point below 300 degrees Fahrenheit, bringing them in contact with value-bearing materials, thence passing them through a neutralizing bath, and recovering the values from said value-bearing materials; substantially as described.

In testimony whereof, I have hereunto set my hand.

RALPH BAGGALEY.

Witnesses:
C. P. BYRNES,
H. M. CORWIN.